US006967791B2

(12) United States Patent
Schmidtke et al.

(10) Patent No.: US 6,967,791 B2
(45) Date of Patent: Nov. 22, 2005

(54) ILLUMINATION SYSTEMS AND METHODS

(75) Inventors: Gregg S. Schmidtke, Fort Collins, CO (US); Kelly John Reasoner, Fort Collins, CO (US); Richard Alan Irwin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 540 days.

(21) Appl. No.: 10/008,837

(22) Filed: Dec. 6, 2001

(65) Prior Publication Data

US 2003/0106936 A1 Jun. 12, 2003

(51) Int. Cl.$^7$ .............................................. G02B 27/02
(52) U.S. Cl. ...................... 359/806; 362/544; 362/545; 362/249
(58) Field of Search .......................... 359/290–91, 295, 359/308, 806, 809; 362/543–6, 249, 326

(56) References Cited

U.S. PATENT DOCUMENTS

| | | | | |
|---|---|---|---|---|
| 3,767,305 A | * | 10/1973 | Craven | 356/71 |
| 4,117,602 A | * | 10/1978 | Lapeyre | 33/352 |
| 4,734,734 A | | 3/1988 | Yano | 399/186 |
| 5,099,465 A | | 3/1992 | Geiger | 369/30.34 |
| 5,231,536 A | | 7/1993 | Wilt | 359/436 |
| 5,523,591 A | | 6/1996 | Fleming et al. | 257/91 |
| 5,615,047 A | | 3/1997 | Komatsuda et al. | 359/618 |
| 5,661,287 A | | 8/1997 | Schaefer et al. | 235/383 |
| 5,755,036 A | * | 5/1998 | Lewis | 33/355 R |
| 6,031,676 A | | 2/2000 | Oenes et al. | 360/60 |
| 6,097,562 A | | 8/2000 | Thomas, III | 360/60 |
| 6,222,667 B1 | | 4/2001 | Gobeli | 359/323 |
| 6,246,826 B1 | | 6/2001 | O'Keefe et al. | 385/140 |
| 6,300,154 B2 | | 10/2001 | Clark et al. | 438/48 |
| 6,552,866 B1 | | 4/2003 | Lechner | 360/69 |
| 6,557,174 B2 | * | 5/2003 | Martin et al. | 2/8 |
| 6,693,858 B2 | | 2/2004 | Reasoner et al. | 369/30.32 |

FOREIGN PATENT DOCUMENTS

DE 198 37 056 3/2000
EP 1 244 051 9/2002

OTHER PUBLICATIONS

Search Report from the U.K. Patent Office, dated Apr. 23, 2003, in corresponding U.K. Patent Application No. GB 0227219.3 of Hewlett-Packard Co.
University of California, Space Sciences Laboratory "Cosmic Hot Interstellar Plasma Spectrometer: The Chips Instrument", last updated Nov. 3, 1999, pp. 1-7.
"Oceans Optics Introduces Fiber Optic Variable Attenuator" Ocean Optics, Inc., last modified Nov. 26, 2001, 1 page.
"Fiber Optic Variable Attenuator" Ocean Optics, Inc., last modified Nov. 26, 2001, 3 pages.

* cited by examiner

Primary Examiner—Jordan M. Schwartz
Assistant Examiner—Jessica Stultz (57) ABSTRACT

System and method for illuminating a target area with a desired illumination pattern. According to preferred embodiments of the invention, a cartridge-engaging assembly may be positioned adjacent a data cartridge, light may be emitted from at least one light source on the cartridge-engaging assembly, and a portion of the emitted light may be attenuated so that the unblocked light illuminates the target area with the desired illumination pattern.

31 Claims, 7 Drawing Sheets

ILLUMINATION SYSTEMS AND METHODS

FIELD OF THE INVENTION

The invention generally pertains to illumination systems in general, and more specifically, to systems and methods for illuminating a target area with a desired pattern.

BACKGROUND OF THE INVENTION

Media storage systems are well-known in the art and are commonly used to store data cartridges at known locations and to retrieve the desired data cartridges so that data may be written to and/or read from the data cartridges. Such media storage systems are also often referred to as autochangers or library storage systems.

A typical media storage system may include one or more different types of cartridge-receiving devices for holding the various data cartridges. For example, one type of cartridge-receiving device may comprise an individual cartridge storage location for holding a single data cartridge. Another type of cartridge-receiving device may comprise a cartridge storage rack or "magazine" for holding a plurality of data cartridges. In any event, such cartridge-receiving devices generally serve to provide storage locations for the data cartridges and may be arranged so that they form one or more vertical stacks, although other arrangements are also possible. A further type of cartridge-receiving device may comprise one or more cartridge read/write devices for reading data from and/or writing data to the data cartridges. Yet another type of cartridge-receiving device may comprise a mail slot for adding and/or removing data cartridges from the media storage system. These cartridge-receiving devices may be located at any convenient position in the media storage system.

The media storage system may also be provided with a cartridge-handling system for transporting the data cartridges between the various cartridge-receiving devices. For example, the cartridge-handling system may transport the data cartridges between the cartridge storage location or racks and the cartridge read/write device. Or for example, the cartridge-handling system may transport a data cartridge from the mail slot to a cartridge storage location or rack. A typical cartridge-handling system may include a cartridge-engaging assembly or "picker" for engaging the various data cartridges contained in the cartridge-receiving devices. In addition, the cartridge-handling system also typically includes a positioning device for moving the cartridge-engaging assembly among the various cartridge-receiving devices.

Media storage systems of the type described above are usually connected to a host computer system that may access or store data on the data cartridges. As an illustration, if the host computer system issues a request for data contained on a particular data cartridge, a control system actuates the positioning system to move the cartridge-engaging assembly along the cartridge storage locations until the cartridge-engaging assembly is positioned adjacent the desired data cartridge. The cartridge-engaging assembly may then remove the data cartridge from the cartridge storage location and carry it to the cartridge read/write device. Once properly positioned adjacent the cartridge read/write device, the cartridge-engaging assembly may insert the selected data cartridge into the cartridge read/write device so that the host computer may thereafter read data from, or write data to, the data cartridge. After the read/write operation is complete, the cartridge-engaging assembly may remove the data cartridge from the cartridge read/write device and return it to the appropriate cartridge storage location.

In use, it is often necessary to identify the data cartridges so that the desired data cartridge may be located and retrieved from the cartridge storage location, or for general inventory purposes. Typically, the data cartridge may be identified by machine-readable indicia such as a bar code label affixed to the data cartridge. A suitable illumination and detection system, such as a bar code reader, is usually mounted to the cartridge access device for reading the machine-readable indicia from the data cartridge. By way of example, when the cartridge access device is positioned adjacent the data cartridge, the bar code reader may be activated to illuminate and decode the bar code label on the data cartridge to identify the data cartridge. The bar code reader may also be activated to illuminate other machine-readable indicia (e.g., alignment markers) on the cartridge read/write device and/or on the cartridge storage locations for positioning the cartridge access device adjacent thereto.

In some instances, the illumination system may not evenly illuminate the machine-readable indicia. For example, light emitted by the illumination system may overlap in some areas, causing higher light intensities in the areas of overlapping light and lower light intensities in other areas. Such uneven illumination of the machine-readable indicia may cause the detector system to misread the machine-readable indicia, or in some instances, may even render the machine-readable indicia unreadable.

SUMMARY OF THE INVENTION

An embodiment of a system for illuminating a target area with a desired illumination pattern comprises means for producing light to illuminate the target area and means for attenuating a portion of the produced light. Preferably, means are also provided for positioning the means for attenuating light in a registration position with respect to the means for producing light so that the attenuated light is blocked from a portion of the target area and the unblocked light illuminates the target area with the desired illumination pattern.

Another embodiment of a system for illuminating a target area on a data cartridge with a desired illumination pattern comprises a cartridge-engaging assembly positionable adjacent the data cartridge. Preferably, a light source and a light attenuator are mounted to the cartridge-engaging assembly. The light attenuator blocks a portion of the light emitted by the light source so that the unblocked light illuminates the target area with the desired illumination pattern.

An embodiment of a method for illuminating a target area on a data cartridge with a desired illumination pattern comprises positioning a cartridge-engaging assembly adjacent to the data cartridge, emitting light from at least one light source on the cartridge-engaging assembly, and attenuating a portion of the emitted light so that the unblocked light illuminates the target area with the desired illumination pattern.

BRIEF DESCRIPTION OF THE DRAWINGS

Illustrative and presently-preferred embodiments of the invention are illustrated in the drawings, in which.

DESCRIPTION OF THE PREFERRED EMBODIMENT

Figure 1:
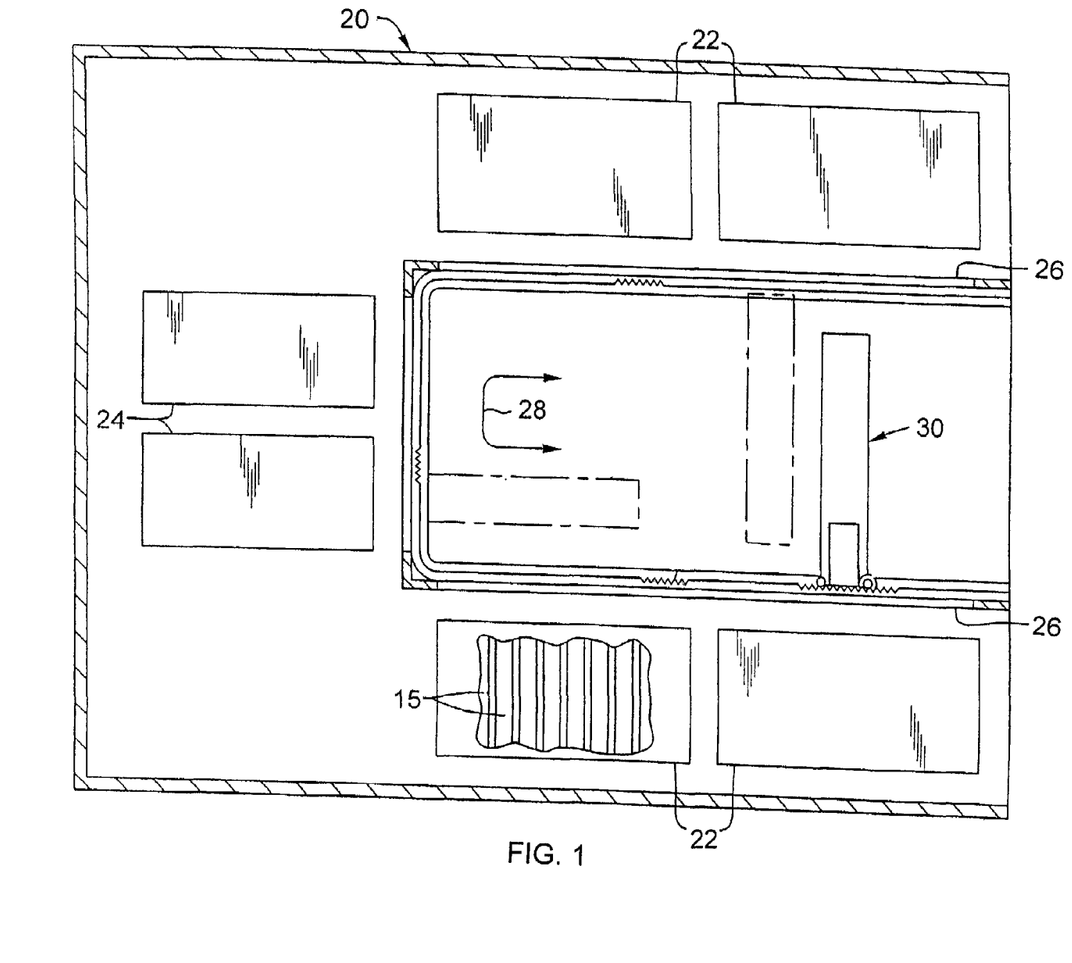
FIG. 1 is a plan view of a media storage system that utilizes the illumination system according to one embodiment of the invention.

One embodiment of system 10 (FIG. 3) and method for illuminating a target area 47 with a desired illumination pattern 75 (FIG. 9) are shown and described herein as they could be used in media storage system 20 (FIG. 1). Briefly, media storage systems 20 are used to store large volumes of computer-readable data. The computer-readable data is typically stored on multiple data cartridges 15 that are arranged in one or more cartridge-receiving devices of the media storage system 20 (e.g., in storage magazines 22, read/write devices 24). The media storage system 20 may include a cartridge-engaging assembly 30 that can be moved among the cartridge-receiving devices and positioned adjacent a data cartridge 15 stored therein. Machine-readable indicia (e.g., bar code labels) may be affixed to the data cartridges 15 (e.g., on target area 47 thereof) for uniquely identifying the data cartridges 15 using suitable illumination and detector systems (e.g., a bar code reader). However, if the illumination system 10 does not evenly illuminate the machine-readable indicia (see illumination pattern 74 in FIG. 8), it may be misread or even rendered unreadable.

Figure 3:
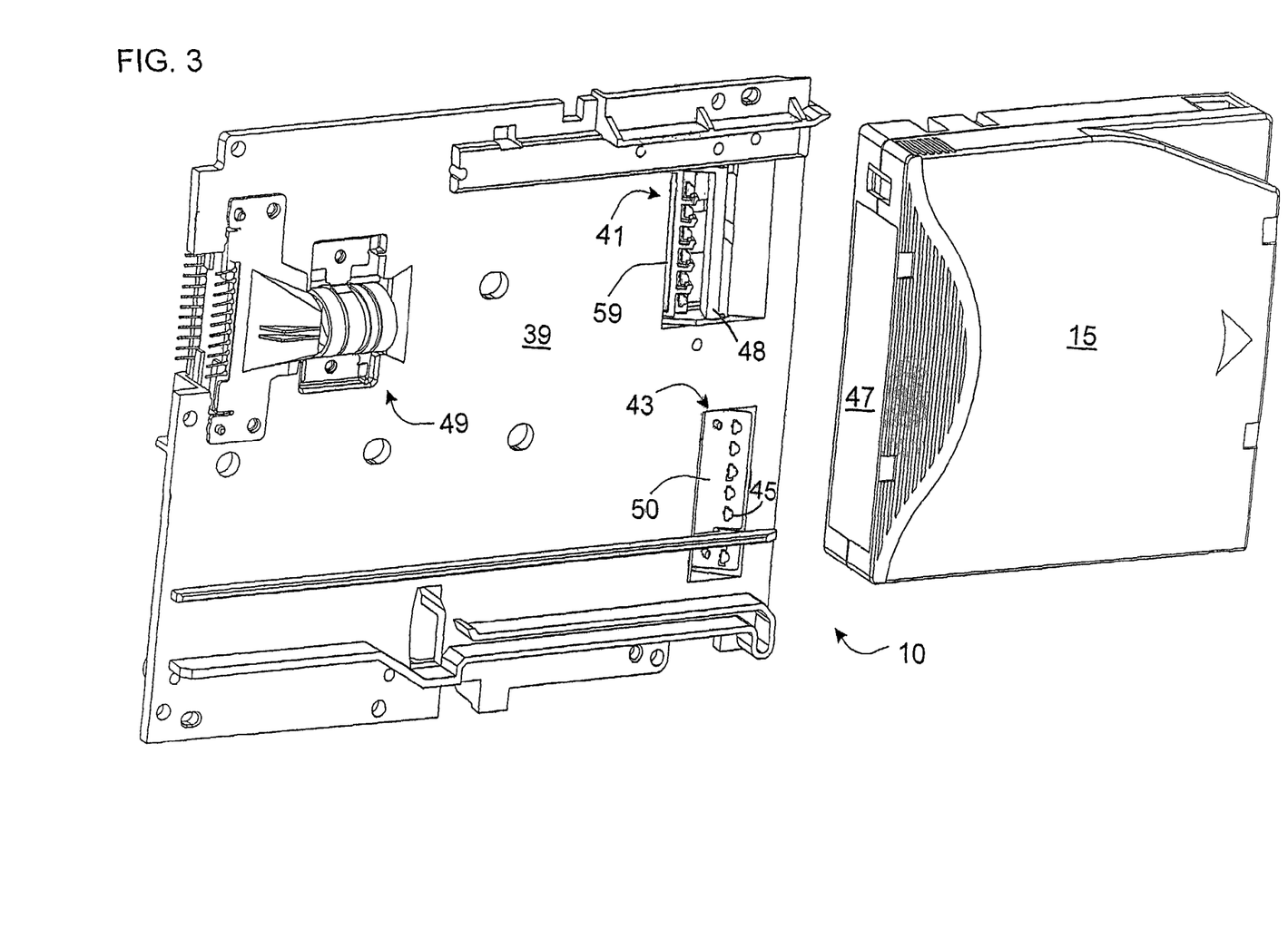
FIG. 3 is a perspective view of the side panel removed from the cartridge-engaging assembly of FIG. 2 and positioned adjacent a data cartridge to show one embodiment of the illumination system.
Figure 7:
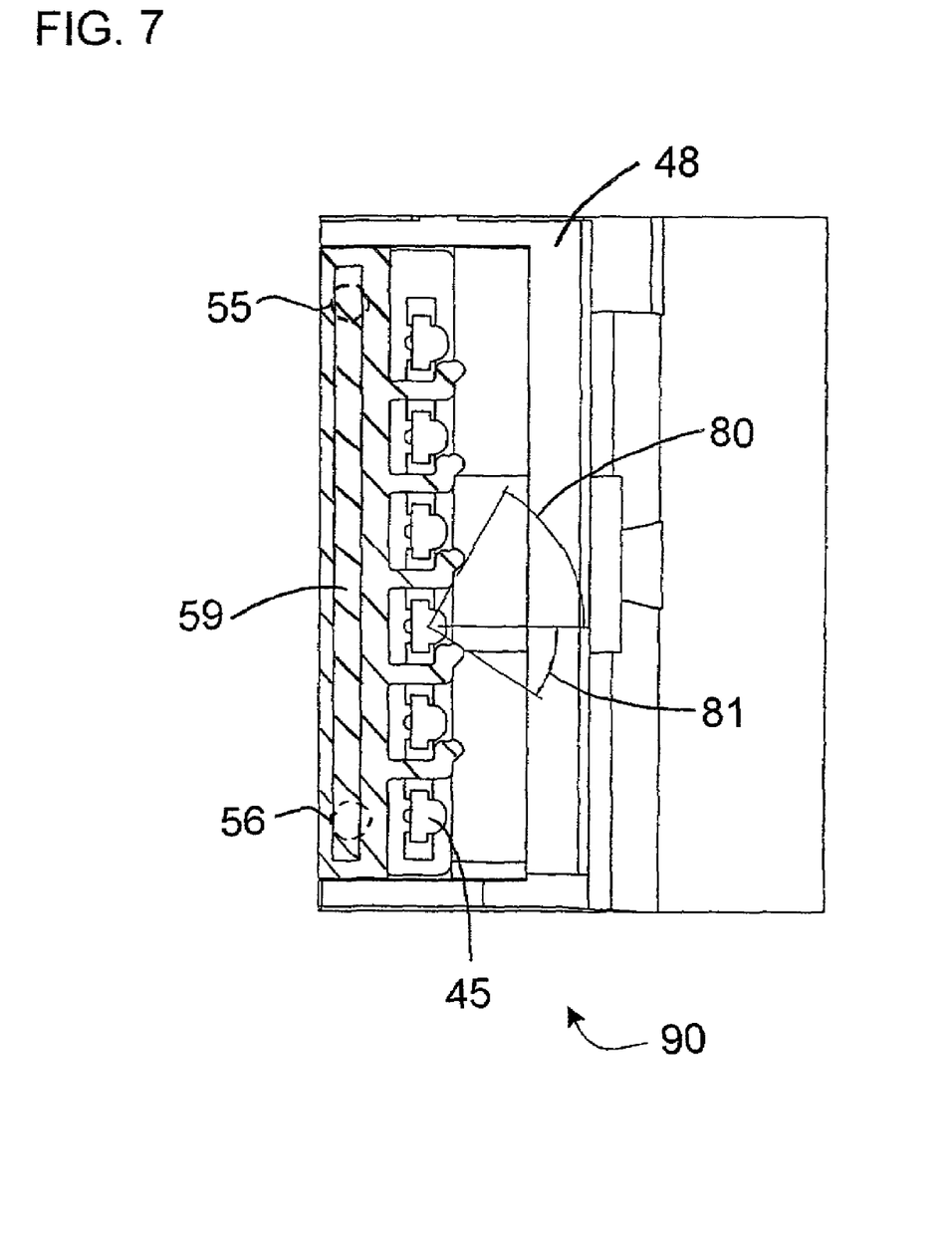
FIG. 7 is a detailed planar view of the light attenuator shown in FIG. 5 mounted adjacent a light source on the cartridge-engaging assembly, according to one embodiment of the invention.

According to the teachings of the invention, an embodiment of a system 10 for illuminating a target area 47 with a desired illumination pattern 75 (see FIG. 9) may comprise means 41 for producing light to illuminate the target area 47, and means 59 for attenuating a portion of the light produced thereby (see FIG. 3). Also according to such an embodiment, means are also preferably provided for positioning the means 59 for attenuating light in a registration position 90 (as shown in FIG. 7) with respect to the means 41 for producing light. For example, cylindrical tabs 67, 68 (FIG. 5) on the light attenuator 59 may fit within or engage circular openings 51, 52 that may be formed on the printed circuit substrate 50 and/or circular openings 55, 56 that may be formed through the lens 48. However, it is understood that other suitable registration means may be provided in other embodiments (e.g., adhesive, snaps, magnets, etc.). In any event, the attenuated light is blocked from a portion 72 of the target area 47 and the unblocked light illuminates the target area 47 with the desired illumination pattern 75.

Figure 9:
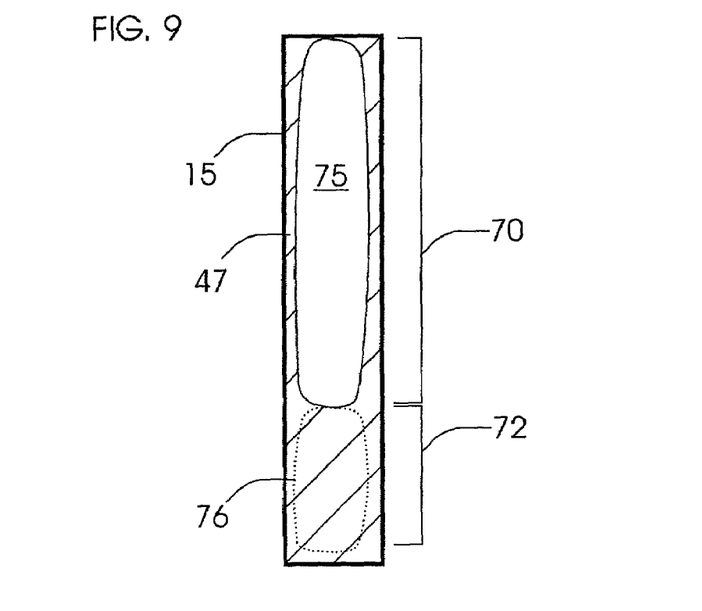
FIG. 9 is an illustration of a desired illumination pattern on the data cartridge according to one embodiment of the invention.

Another embodiment of system 10 for illuminating a target area 47 with a desired illumination pattern 75 is also disclosed. According to this embodiment, a cartridge-engaging assembly 30 is positionable adjacent the data cartridge 15, as shown in FIG. 3. Preferably, a light source 41 and a light attenuator 59 are mounted to the cartridge-engaging assembly 30, as shown according to one such embodiment in FIG. 7. The light attenuator 59 preferably blocks a portion of the light emitted by the light source 41 so that the unblocked light illuminates the target area 47 with the desired illumination pattern 75, as shown in FIG. 9.

The system 10 for illuminating a target area 47 with a desired illumination pattern 75 may be operated as follows according to one embodiment of the invention. The cartridge-engaging assembly 30 may be positioned adjacent to the data cartridge 15. For example, the cartridge-engaging assembly 30 may be moved along the positioning rail 26 (i.e., in the directions of arrow 28) in the media storage system 20 and positioned adjacent a data cartridge 15. At least one of the light sources 41, 43 on the cartridge-engaging assembly 30 may be powered to emit light and focus it onto the target area 47 of the data cartridge 15. Preferably, a portion of the emitted light is attenuated (e.g., by light attenuator 59) so that the unblocked light illuminates the target area 47 with the desired illumination pattern 75 (FIG. 9).

The embodiments of the invention may be used to illuminate the target area 47 with a desired illumination pattern 75. Accordingly, areas of high-intensity illumination and areas of lower-intensity illumination on the target area are preferably reduced, and may even be altogether eliminated, so that the machine-readable indicia may be read faster and with greater accuracy.

Having generally described embodiments of illumination systems 10 and methods, and several advantages thereof, the invention and other embodiments thereof will now be described in further detail.

An embodiment of the illumination system 10 may comprise an autochanger or media storage system 20 such as that shown in FIG. 1. The media storage system 20 includes one or more data cartridges 15 arranged in one or more cartridge-receiving devices (e.g., storage magazine 22, read/write device 24, a mail slot (not shown), etc.). In use, a control system (not shown) associated with the media storage system 20 moves a cartridge-engaging assembly 30 (i.e., a "picker" and a positioning device) along a positioning rail 26. The cartridge-engaging assembly 30 thus may be moved adjacent the cartridge-receiving device(s) to access and deliver the data cartridge(s) 15 according to requests by a host computer (not shown) suitably linked to the media storage system 20 (e.g., via a direct connection, remote connection, network connection, etc.).

As an illustration of the use of the media storage system 20, the host computer may issue a request to access a data cartridge 15 stored in one of the storage magazines 22 to read and/or write data thereto. In response, the control system moves the cartridge-engaging assembly 30 along the positioning rail 26 (i.e., in the directions of arrow 28). The control system positions the cartridge-engaging assembly 30 adjacent the requested data cartridge 15. Once positioned, the control system signals the cartridge-engaging assembly 30 to withdraw the data cartridge 15 from the storage magazine 22 and to carry it to the read/write device 24 where the linked computer can read and/or write computer-readable data thereon.

Figure 2:
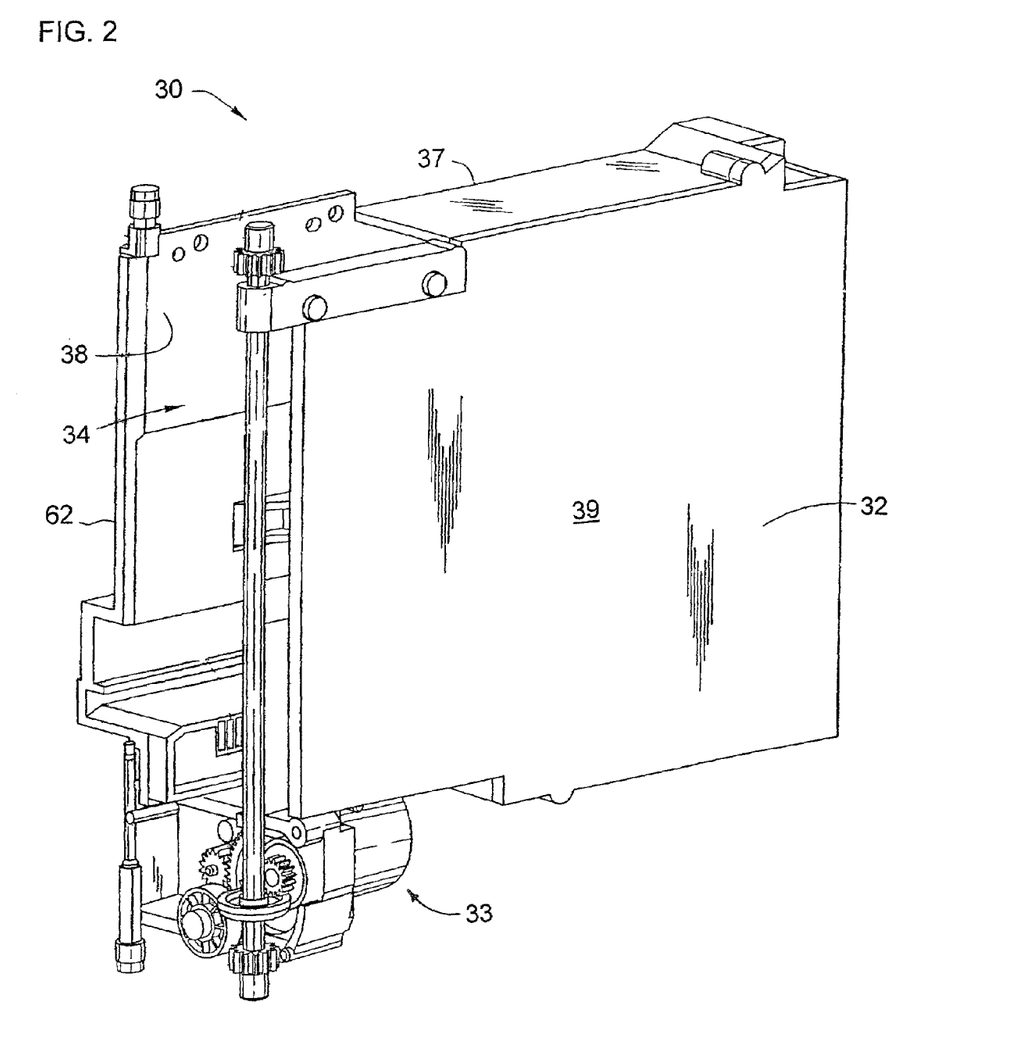
FIG. 2 is a perspective view of a cartridge-engaging assembly of the media storage system shown in FIG. 1.

An exemplary cartridge-engaging assembly 30 for use with the media storage system 20 is shown in FIG. 2. The cartridge-engaging assembly 30 is adapted to: engage a data cartridge 15 contained in a cartridge-receiving device, and then draw the data cartridge 15 into the cartridge-engaging assembly 30 for transport to a different cartridge-receiving device. The cartridge-engaging assembly 30 may comprise a frame assembly 32 (e.g., sides 37, 38, 39) that defines a chamber or cavity 34 sized to receive the data cartridge 15 therein.

A cartridge plunge mechanism (not shown) may be slidably mounted to the frame assembly 32. The cartridge plunge mechanism may be moved from within the chamber 34 toward the cartridge access end 62 of the frame assembly 32 (i.e., to an extended position) to engage the data cartridge 15. Once engaged, the cartridge plunge mechanism may be moved back into the chamber 34 away from the cartridge access end 62 of the frame assembly 32 (i.e., to a retracted position) to withdraw the data cartridge 15 from the cartridge-receiving device for transport within the media storage system 20.

The cartridge plunge mechanism may also be provided with a finger assembly (not shown) configured to engage the data cartridge 15. The finger assembly enables the cartridge plunge mechanism to engage and withdraw the data cartridge 15 from the cartridge-receiving device(s) when so directed. Movement of the cartridge-engaging assembly 30 may be achieved via an actuator system 33 that moves the cartridge-engaging assembly 30 along the U-shaped path of the cartridge-positioning system 26.

The foregoing description of the media storage system 20 and cartridge-engaging assembly 30 is provided in order to better understand one environment in which the illuminator system 10 of the invention may be used. However, it should be understood that the invention may be used in any of a wide range of other types of media storage systems, and in conjunction with any of a wide range of cartridge-engaging assemblies now known or that may be developed in the future. Consequently, the invention should not be regarded as being limited to use with the particular media storage system 20 and cartridge-engaging assembly 30 shown and described herein.

Turning now to a more detailed discussion of the illumination system 10 of the invention, the side panel 39 is shown removed from the cartridge-engaging assembly 30 in FIG. 3 to show an embodiment of the illumination system 10 that may be mounted to the interior of the side panel 39 (i.e., the portion of the side panel 39 within the chamber 34 formed by the frame assembly 32). The illumination system 10 preferably comprises at least one light source 41 which emits light directed outward from the chamber 34 formed in the cartridge-engaging assembly 30, and onto the leading edge or target area 47 of a data cartridge 15 positioned adjacent thereto. In a preferred embodiment, the illumination system 10 preferably also comprises at least one additional light source (e.g., light source 43) for supplemental illumination of the target area 47 on the data cartridge 15. The light emitted by the light source 41 preferably strikes the target area 47 of the data cartridge 15 and illuminates the machine-readable indicia (not shown) positioned thereon.

In a preferred embodiment, the light source 41 may be provided as part of a bar code reader and may comprise an array of light-emitting diodes (LEDs) positioned on the side panel 39 of the cartridge-engaging assembly 30 so that they will illuminate the machine-readable indicia on the target area 47 of the data cartridge 15. However, it is understood that the illumination system 10 may comprise any of a wide range of light sources that are well-known in the art or that may be developed in the future that are suitable for illuminating the machine-readable indicia provided on the data cartridge 15.

The light is reflected from the target area 47 (i.e., from the machine-readable indicia) and is received by a detector system 49 for reading the machine-readable indicia. The detector system may comprise any of a wide range of detector systems well-known in the art or that may be developed in the future that are suitable for detecting the machine-readable indicia provided to uniquely identify the data cartridges 15. By way of example, in one preferred embodiment, the detector system 49 may comprise a linear array of charged-coupled devices (CCDs) and a lens assembly for focusing image light reflected from the machine-readable indicia (e.g., the bar code label) onto the linear CCD array. The linear CCD array produces an output signal that is indicative of the machine-readable indicia provided on the data cartridge 15.

A control system (not shown) may be operatively associated with the detector system (e.g., the CCD array). The control system is responsive to the output signal and uses the same to decode the machine-readable indicia and properly identify and/or inventory the data cartridge 15. Such control systems for receiving the output signal produced by the detector system 49 are well-known in the art and could be readily provided by persons having ordinary skill in the art after having become familiar with the teachings of the invention. Therefore, particular control systems that may be utilized according to the teachings of the invention will not be described in further detail herein.

Turning once again to the description of the light source(s) 41, 43, each light source 41, 43 may be similarly manufactured. Accordingly, various features of the light sources 41, 43 may be discussed with reference to one or the other, and it is understood that similar features may be found with respect to either light source 41, 43. According to preferred embodiments, the light sources 41, 43 comprise a printed circuit substrate 50 with suitable circuitry for connecting a number of (i.e., one or more) LEDs 45 thereon. The printed circuit substrate 50 may also be linked through an opening formed on the side panel 39 of the cartridge-engaging assembly 30 to a PC board (not shown) that is mounted to the exterior of the side panel 39 for providing power to the LEDs 45. Once again, however, any suitable light sources 41, 43 may be used according to the teachings of the invention, and need not comprise the specific embodiments just described.

Also in a preferred embodiment, a lens 48 may be provided for one or both of the light sources 41, 43. The lens 48 preferably collimates the emitted light to increase the intensity thereof. As such, the increased intensity may be focused on the back of the storage location or magazine to indicate an empty storage location. In addition, the lens 48 may be used for focusing the light emitted therefrom onto the target area 47 of the data cartridge 15.

Figure 4:
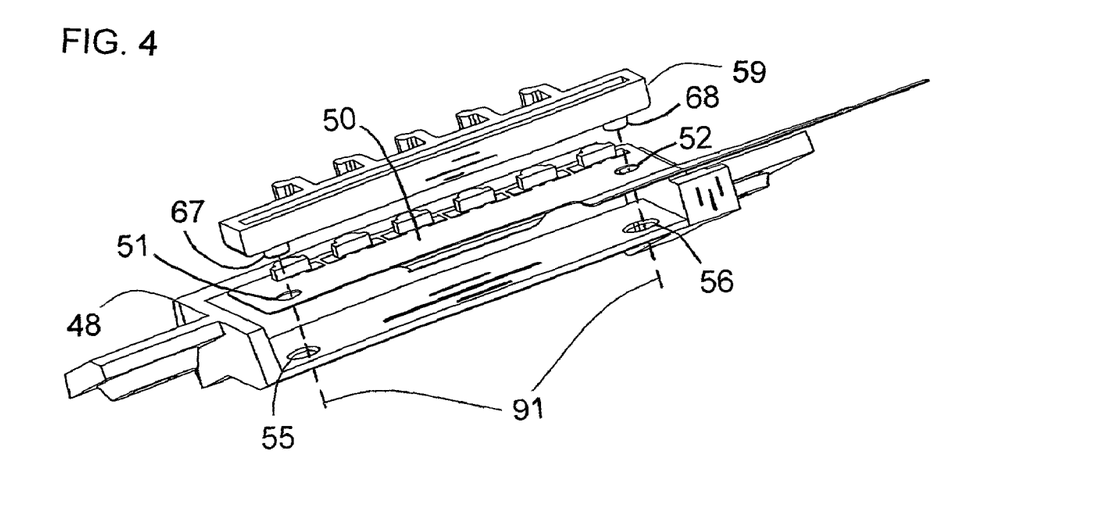
FIG. 4 is a perspective view of one embodiment of registration means for assembling the illumination system.

The light sources 41, 43 may also be provided with registration means for positioning the light source on the side panel 39 of the cartridge access device 30 and for aligning the lens 48 therewith, as shown in further detail in FIG. 4. As an illustration, the light sources 41, 43 may comprise circular openings 51, 52 formed on the printed circuit substrate 50. Likewise, corresponding circular openings 55, 56 may also be formed through the lens 48. During assembly, a tool (not shown) having cylindrical engagement means may engage the circular openings 55, 56 formed through the lens 48 and hence may be used to position it adjacent the printed circuit substrate 50 by aligning the cylindrical tips of the tool with the circular openings 51, 52 formed through the printed circuit substrate 50 (e.g., see alignment lines 91 in FIG. 4).

A light attenuator 59 is preferably provided for one or more of the light sources 41, 43 to block a portion of the light emitted therefrom. The light attenuator 59 may be mounted to the side panel 39 of the cartridge access device 30 in any suitable manner, such as is shown in FIG. 3. In a preferred embodiment, the light attenuator 59 is positioned adjacent the light source 41 using the registration means previously described for positioning the lens 48 adjacent the light source 41. According to one such embodiment, cylindrical tabs 67, 68 (FIG. 5) may be formed on or otherwise mounted to the light attenuator 59. The cylindrical tabs 67, 68 fittingly engage the circular openings 51, 52 formed through the printed circuit substrate 50 and/or the circular openings 55, 56 formed through the lens 48, as illustrated by lines 91 in FIG. 4. Hence, the cylindrical tabs 67, 68 may be aligned with the circular openings 55, 56 and press-fit together.

Although preferred embodiments of the registration means have been described above, it is understood that the scope of the invention is not limited to any particular registration means. In other embodiments, for example, the registration means may comprise any suitable shapes (e.g., square, triangular), tabs, clips, hooks, interlocking components, etc., for positioning the light source 41, 43, the lens 48, and/or the light attenuator 59 in a registration position 90 (as shown in FIG. 7) with respect to one another. In yet other embodiments, for example, suitable markings may be used for positioning the light source 41, 43, the lens 48, and/or the light attenuator 59.

Once positioned, the light attenuator 59 may be mounted adjacent the light source 41 using a suitable adhesive. Likewise, other embodiments for mounting the light attenuator 59 adjacent the light source 41 are also contemplated as being within the scope of the invention. For example, the light attenuator 59 may be integrally formed as part of, or separately mounted to the printed circuit substrate 50, the lens 48, etc.

The light attenuator 59 may be manufactured from any suitable material or composition of materials. Preferably, the light attenuator 59 is made of a non-conducting material so that it does not interfere with the other on-board electrical circuitry. For example, the light attenuator may be integrally-molded plastic. However, it is understood that the light attenuator 59 may be manufactured in any suitable manner and of any suitable material and that various other embodiments will depend upon design considerations.

Figure 5:
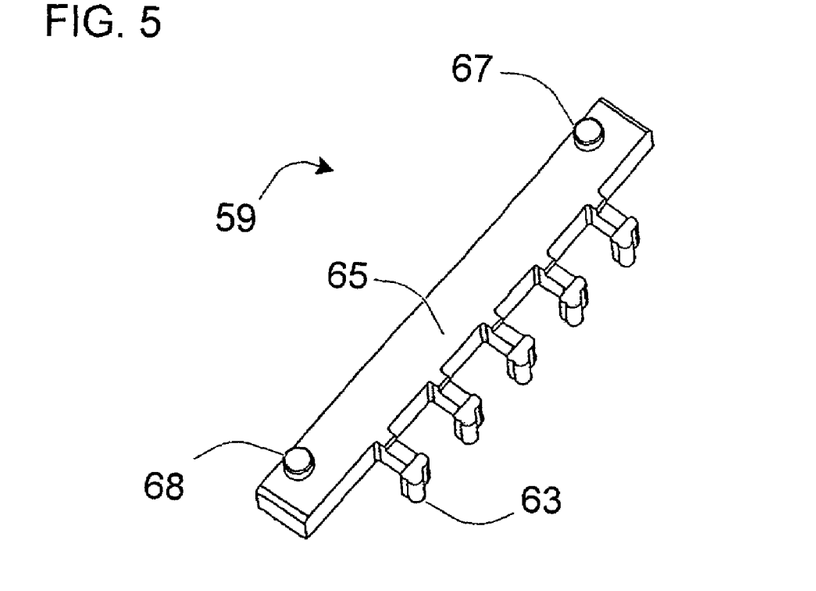
FIG. 5 is a perspective view of one embodiment of a light attenuator for use with the illumination system.
Figure 6:
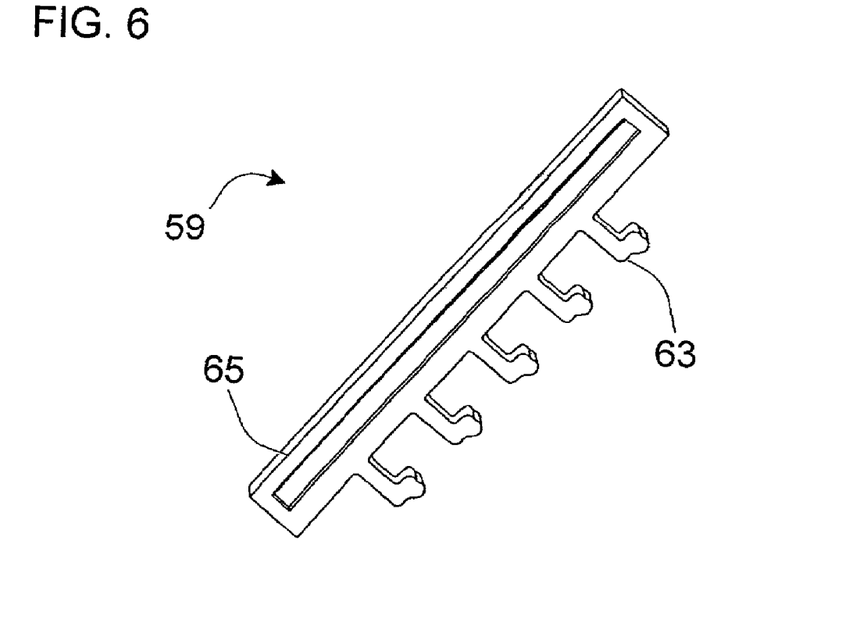
FIG. 6 is another perspective view of the light attenuator shown in FIG. 5.

One preferred embodiment of the light attenuator 59 is shown in further detail in FIG. 5 and FIG. 6. As shown with respect to this embodiment, the light attenuator 59 may comprise a number of (i.e., one or more) substantially L-shaped, light-attenuating arms 63 that are preferably evenly spaced from one another and protrude from a support member 65 in a "comb" configuration. Hence, the light-attenuator may also be referred to as an "illumination comb". Although the light attenuator 59 shown and described herein is one preferred embodiment thereof, it is understood that other embodiments of the light attenuator 59 are also contemplated as being within the scope of the invention.

The light attenuator 59 shown in FIG. 5 and FIG. 6 is a preferred embodiment thereof and the scope of the invention is not intended to be limited thereto. Other embodiments of the light attenuator 59 will occur to those skilled in the art, based on various design considerations, and are also contemplated as being within the scope of the invention.

As was previously discussed in more detail, the cylindrical tabs 67, 68 for positioning the light attenuator 59 in a registration position 90 with respect to the light source 41 may be formed on the mating surface of the support member 65 of the light attenuator 59. Accordingly, the light attenuator 59 may be mounted adjacent the light source 41, as shown in more detail in FIG. 7. That is, the registration means 67, 68 (FIG. 5) may be fitted into the openings 55, 56 formed through the lens 48 and/or the openings 51, 52 formed on the printed circuit substrate 50 behind the array of LEDs 45. Optionally, an adhesive may be applied to the mating surface of the support member 65 to retain the light attenuator 59 thereon.

Once assembled, the light-attenuating arms 63 preferably extend from the support arm 65 between adjacent LEDs 45 so that portions thereof extend partially in front of the LEDs 45. According to the embodiment shown in FIG. 3, the side panel 39 blocks (i.e., the edges of the "cut-out" portion therein) a portion of the light emitted from either of the "end" LEDs 45 so that light-attenuating arms 63 may not be provided at the ends of the LED array. However, in other embodiments, light-attenuating arms 63 may also be provided to attenuate or block a portion of the light emitted by these LEDs.

In use, the light sources 41, 43 may emit light for illuminating the target area 47 of the data cartridge 15 when the cartridge-engaging assembly 30 is positioned adjacent to the data cartridge 15 (e.g., positioned as shown in FIG. 3). The light-attenuating arms 63 serve to block a portion of the light, as shown in FIG. 7. According to one embodiment, about two-thirds of the light that would otherwise be emitted toward the lower portion 72 (FIG. 8) of the data cartridge 15 is blocked by the light-attenuating arms 63, as illustrated by angle 81 in FIG. 7. Also according to this embodiment, about one-third of the light that is emitted upward to illuminate the upper portion 70 of the data cartridge 15 is blocked by the light-attenuating arms 63, as illustrated by angle 80. Hence, about one-half of the light emitted by the LED bank 41 is blocked by the light-attenuating means 59.

It is understood, however, that FIG. 7 and the corresponding discussion of the portion of blocked light is merely illustrative of one embodiment of the invention. In other embodiments, more or less light than that shown in FIG. 7 may be blocked, and the portions of light that are blocked will depend on design considerations such as the distance from the light source 41, 43 to the data cartridge 15, the intensity of the emitted light, the desired illumination pattern, to name but a few.

Figure 8:
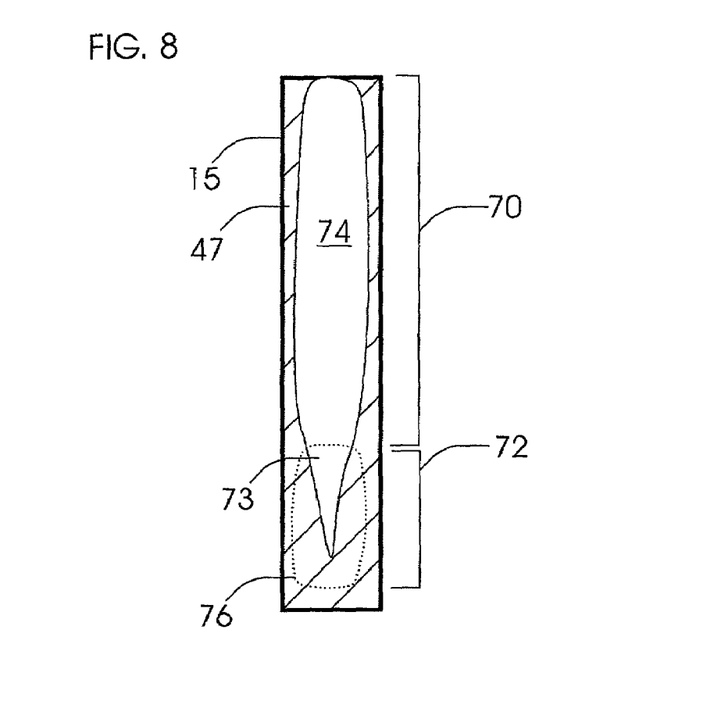
FIG. 8 is an illustration of an illumination pattern on the data cartridge.

The illumination pattern produced by the unblocked light on the target area 47 of the data cartridge 15 is illustrated according to one embodiment in FIG. 8 and FIG. 9. Prior to positioning the light attenuator 59 adjacent the light source 41, the light source 41 may produce an illumination pattern 74 on the target area 47 of the data cartridge 15 which may comprise a "light-tail" 73 extending onto the lower portion 72 of the target area 47, such as that illustrated in FIG. 8. The light tail 73 may result in an uneven illumination pattern, such as when it is combined with light emitted from an additional light source 43. For example, when only the first light source 41 is used to illuminate the target area 47, the portion of a bar code label affixed to the target area 47 in the lower portion 72 of the data cartridge 15 the bar code reader may misread, or be unable to read the bar code label. When the second light source 43 is used to supplement illumination of the target area 47 in the lower portion 72 (e.g., illumination pattern 76 shown by the dashed outline), the combined light intensity of the light tail 73 and the light intensity of the illumination pattern 76 where each overlap one another, results in an uneven illumination pattern in the lower portion 72 of the target area 47. Again, the machine-readable indicia in this region may be misread, or may even be unreadable.

A desired illumination pattern 75 produced when a portion of the emitted light is blocked according to one embodiment of the invention is shown in FIG. 9. As is readily apparent, the "light-tail" 73 (FIG. 8) is reduced or altogether eliminated when a portion of the emitted light is blocked. In addition, there is substantially no overlap between the light emitted by the first light source 41 and the light emitted by the second light source 43. Hence, according to this embodiment the first light source 41 may be used to illuminate the upper portion 70 of the target area 47 of the data cartridge 15, and the second light source 43 may be used to illuminate the lower portion 72 of the target area 47 of the data cartridge 15 with limited, if any, interference therebetween. The machine-readable indicia illuminated by the desired illumination pattern 75 and the illumination pattern 76 can therefore be read faster and with greater accuracy.

It should be noted that the illumination patterns shown and described with respect to FIG. 8 and FIG. 9 are merely provided as an illustration of various illumination patterns that may be produced, but are not intended to limit the scope of the invention. It will be readily understood by one skilled in the art that various illumination patterns may be produced by altering one or more design parameters, such as the intensity and/or the positioning of the light source(s), the type of light source, the surface of the data cartridge, the distance of the light source(s) from the data cartridge, and so forth.

It should further be noted that although the invention is illustrated using a particular media storage system 20, the teachings of the invention may be utilized in any of a wide range of media storage systems now known in the art or that may be developed in the future. Accordingly, the invention should not be regarded as limited to the particular media storage system 20 shown and described herein. It should also be noted that while the media storage system 20 is shown and described herein as it could be used to store and retrieve a linear tape open (LTO) data cartridge having a standard size and configuration, it is not limited to any particular type or style of data cartridge. Indeed, the invention disclosed herein could be used with any type of storage medium (e.g., magnetic disk or tape, optical disk, etc.). Consequently, the present invention should not be regarded as limited to use with the media storage system 20 for the data cartridge 15 shown and described herein.

What is claimed is:

1. A system for illuminating a target area with a desired illumination pattern, comprising:
    means for producing light to illuminate said target area, said means for producing comprising a light source;
    means for attenuating a portion of the produced light;
    means for positioning said means for attenuating light in a registration position with respect to said means for producing light so that the attenuated light is blocked from a portion of said target area and the unblocked light illuminates said target area with said desired illumination pattern; and
    another light source for illuminating another portion of said target area,
    wherein there is substantially no overlap in light emitted from each of said light sources.

2. The system of claim 1, wherein said means for attenuating a portion of the produced light comprises at least one substantially L-shaped arm.

3. The system of claim 1, wherein said means for attenuating a portion of the produced light comprises a plurality of arms evenly spaced from one another.

4. The system of claim 1, further comprising means for focusing light emitted by said means for producing light onto said target area.

5. The system of claim 4, wherein said means for attenuating a portion of the produced light is mounted in a registration position on said means for focusing light.

6. The system of claim 1, wherein said desired illumination pattern excludes a lower portion of said target area.

7. A system for illuminating a target area with a desired illumination pattern, comprising:
    a light source having plural light emitters each to produce light to illuminate said target area;
    a light attenuator having plural blocking elements for blocking a portion of the produced light from each light emitter;
    a guide for positioning said light attenuator in a registration position with respect to said light source so that a portion of the produced light from each light emitter is blocked from said target area and the unblocked light from each light emitter illuminates said target area to achieve said desired illumination pattern.

8. A system for illuminating a target area on a data cartridge with a desired illumination pattern, comprising:
    a cartridge-engaging assembly positionable adjacent said data cartridge;
    a light source mounted to said cartridge-engaging assembly; and
    a light attenuator mounted to said cartridge-engaging assembly for blocking a portion of light emitted by said light source so that the unblocked light illuminates said target area with said desired illumination pattern.

9. The system of claim 8, wherein said light attenuator has at least one light-attenuating arm.

10. The system of claim 9, wherein said at least one light-attenuating arm is substantially L-shaped.

11. The system of claim 8, further comprising registration means for positioning said light attenuator in a registration position with respect to said light source.

12. The system of claim 8, further comprising:
    a lens to focus said light emitted by said light source onto said target area; and
    a detector to detect light reflected from the target area.

13. The system of claim 12, wherein said light attenuator is mounted in a registration position to said lens.

14. The system of claim 8, wherein said light source is at least one light-emitting diode.

15. A method for illuminating a target area on a data cartridge with a desired illumination pattern, comprising:
    positioning a cartridge-engaging assembly adjacent to said data cartridge;
    emitting light from at least one light source on said cartridge-engaging assembly; and
    attenuating a portion of said emitted light so that the unblocked light illuminates said target area with said desired illumination pattern.

16. The method of claim 15, wherein emitting light is from both a first light source and a second light source on said cartridge-engaging assembly, and only a portion of said emitted light from said first light source is attenuated.

17. A method for illuminating a target area on a data cartridge with a desired illumination pattern, comprising:
    positioning a cartridge-engaging assembly adjacent to said data cartridge;
    emitting light from at least one light source on said cartridge-engaging assembly;

attenuating a portion of said emitted light so that the unblocked light illuminates said target area with said desired illumination pattern,
wherein emitting light is from both a first light source and a second light source on said cartridge-engaging assembly, and only a portion of said emitted light from said first light source is attenuated; and
attenuating said portion of said emitted light so that there is substantially no overlap between the light emitted by said first light source and the light emitted by said second light source.

18. The method of claim 15, wherein attenuating said portion of said emitted light reduces the formation of a light tail on said data cartridge.

19. The method of claim 15, further comprising aligning said light-attenuating means with said at least one light source.

20. The method of claim 19, further comprising providing registration means for aligning said light-attenuating means with said at least one light source.

21. The method of claim 15, further comprising attenuating about one-half of said emitted light.

22. The system of claim 7, further comprising:
a lens to focus light from the light emitters onto the target area; and
a detector to detect light reflected from the target area.

23. The system of claim 7, wherein the light source comprises a first light source to illuminate a first portion of the target area, the system further comprising a second light source to illuminate a second portion of the target area, wherein substantially no light from the first light source illuminates the second portion of the target area.

24. The system of claim 7, further comprising a cartridge-engaging assembly movable to plural positions to engage corresponding plural data cartridges, the light source and light attenuator mounted to the cartridge-engaging assembly.

25. The system of claim 7, further comprising a bar code reader, the light source being part of the bar code reader, and wherein the target area comprises a bar code onto which the light source emits light.

26. The system of claim 8, wherein the light source has plural light emitting elements, and wherein the light attenuator has plural light blocking elements to attenuate emitted light from respective light emitting elements,
wherein the light attenuator has a support member to which are attached the light blocking elements.

27. The system of claim 8, wherein the light source has plural light emitting elements, and wherein the light attenuator has plural light blocking elements to attenuate emitted light from respective light emitting elements,
wherein the light source comprises a substrate on which the light emitting elements are formed, the light attenuator being attached to the substrate.

28. The system of claim 8, wherein the cartridge-engaging assembly is adapted to withdraw the data cartridge from a cartridge-receiving device.

29. The method of claim 15, wherein the data cartridge comprises a first data cartridge, and wherein positioning the cartridge-engaging assembly comprises moving the cartridge-engaging assembly from a first position adjacent a second data cartridge to a second position adjacent the first data cartridge.

30. The method of claim 15, further comprising reading indicia in the target area based on illuminating the target area with the light source, the indicia to identify the data cartridge.

31. The method of claim 15, further comprising reading, by a bar code reader, a bar code in the target area based on illuminating the target area with the light source.

* * * * *

UNITED STATES PATENT AND TRADEMARK OFFICE
CERTIFICATE OF CORRECTION

PATENT NO. : 6,967,791 B2
APPLICATION NO. : 10/008837
DATED : November 22, 2005
INVENTOR(S) : Gregg S. Schmidtke et al.

It is certified that error appears in the above-identified patent and that said Letters Patent is hereby corrected as shown below:

In column 2, line 6, delete "cartridge" and insert -- cartridges --, therefor.

In column 8, line 13, after "portion" insert -- formed --.

Signed and Sealed this

Fourth Day of August, 2009

JOHN DOLL
*Acting Director of the United States Patent and Trademark Office*